United States Patent [19]

Hoppe et al.

[11] 3,856,742

[45] Dec. 24, 1974

[54] PROCESS FOR IMPROVING THE ANTI-FRICTION PROPERTIES OF POLYMERIC SUBSTANCES

[75] Inventors: Lutz Hoppe; Rudolf Behn, both of Walsrode, Germany

[73] Assignee: Wolff Walsrode Aktiengesellschaft, Walsrode, Germany

[22] Filed: May 14, 1973

[21] Appl. No.: 359,644

Related U.S. Application Data

[63] Continuation of Ser. No. 258,468, May 31, 1972, abandoned, which is a continuation of Ser. No. 69,503, Sept. 3, 1970, abandoned.

[30] Foreign Application Priority Data

Sept. 3, 1969 Germany.......................... 1944619

[52] U.S. Cl. ...................... 260/37 N, 260/29.2 N

[51] Int. Cl............................................ C08g 51/04
[58] Field of Search ...................... 260/37 N, 40 R

[56] References Cited

UNITED STATES PATENTS

| | | | |
|---|---|---|---|
| 3,154,461 | 10/1964 | Johnson ..................... | 260/37 N UX |
| 3,419,460 | 12/1968 | Ure ................... | 260/40 R |
| 3,458,470 | 7/1969 | Edgar............................. | 260/37 N |
| 3,645,981 | 2/1972 | Bonner........................ | 260/37 R X |
| 3,661,862 | 5/1972 | Bonin et al. .................. | 260/37 N X |

*Primary Examiner*—Lewis T. Jacobs
*Attorney, Agent, or Firm*—Plumley & Tyner

[57] ABSTRACT

Process for improving the anti-friction properties of polymeric substances by adding silica powders to basically reacting starting monomers and condensing them into the reaction mixture.

2 Claims, No Drawings

PROCESS FOR IMPROVING THE ANTI-FRICTION PROPERTIES OF POLYMERIC SUBSTANCES

This is a continuation of application, Ser. No. 258,468 filed May 31, 1972 now abandoned, which is a continuation of application Ser. No. 69,503 filed Sept. 3, 1970 now abandoned.

PRIOR ART

Processes for improving the anti-friction properties of polymeric substances are already known. For example, powdered silica is admixed with finished film lacquers to provide the material with a better anti-blocking effect. Syloid has also been added to completed polymers in the production of films from polyvinyl chloride and high-pressure polyethylene in order to prevent or reduce adhesion of the films to calender rollers and also to prevent transparent films from becoming dull or generally to prevent films from blocking.

In addition, it has already been proposed in order to improve the anti-blocking properties of lacquered cellulose hydrate films, to add precipitated silica to the lacquer applied to these film substrates. Finally, it is also known from the German Patent Specification No. 1,286,300, that the anti-blocking properties of plastics films can be improved by dusting the films with a powder containing inter alia hydrophobised silica.

Unfortunately, the aforementioned processes for improving the anti-friction properties of polymeric substances all have the disadvantage that, in many cases, the products which improve the anti-friction properties such as for example powdered silica and which without exception are added to the completed polymer or are applied individually or in admixture with other constituents to completed sheet structures, reduce the transparency, the gloss and the ability of the substances to which the powdered silica or suitable mixtures are added to form clear solutions so that the quality of sheet structures such as these is impaired, in some cases very seriously.

OBJECT OF THE INVENTION

The object of the invention is to provide a process for improving the anti-friction properties of polymeric substances of this kind without any of the disadvantages referred to above attending the end product.

THE INVENTION

According to the invention, this object is achieved by the addition of silica powders with an average particle diameter of from 5 millimicrons to 160 microns, to the starting monomers in quantities of from 0.01 to 10% by weight, based on the total quantity of the reaction components, and condensing said silica powders into the reaction mixture.

Examples of silica powders which can be used according to the invention are known under the trade names Syloid and Aerosil.

The addition of silica powders to the starting monomers of compounds to be subsequently polycondensed such as polyamides or polyurethanes, has the advantage that the silica particles react chemically with the monomer mixtures. To this end, it is advisable to initially disperse the silica powder in water and then to add the aqueous dispersion to the basically reacting component of the starting monomers. Shortly after these aqueous dispersion has been added to the basically reacting monomer solutions, hazing of the aqueous dispersion is very considerably reduced as the result of a salt formation between the silica powder and the basic starting components. If by contrast the aqueous silica powder dispersion is added merely to water (rather than to a basically reacting monomer solution), hazing is left unchanged.

By virtue of the process according to the invention for improving the anti-friction properties of polymeric substances, it is possible especially in the case of polyamides to obtain an outstanding degree of transparency and improved anti-friction properties, above all in sheet structures made from these products. This has proved to be of particular advantage especially in the production of products by the processes described in United States Application Ser. No. 823,939, filed May 12, 1969, now abandoned, and United States Application Ser. No. 6,314, filed Jan. 27, 1970, now abandoned. The copolyamides according to the invention are obtained by a process for the production of a shrinkable film forming transparent copolyamide which comprises copoly-condensing 65–85% by weight of $\omega$-amino undecanoic acid and 35–15% by weight of a salt of a dicarboxylic acid selected from the group consisting of terephthalic acid, isophthalic acid, and an acid of the general formula $$HOOC-(CH_2)_n-COOH$$

wherein $n$ is a number greater than four, with a diamine of the general formula $$H_2N - R - NH_2$$

wherein R is a. a mixture of the two isomers

and

(b) 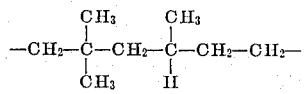

(c) $-(CH_2)_m-$ (d) 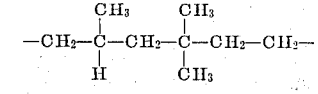

(e)

(f)

or a mixture of these radicals, wherein m is a number greater than two and wherein at least 50 mol % of said diamine consists of the mixture of the two isomers

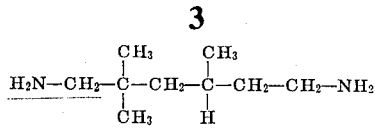

and

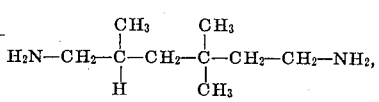

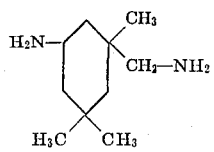

or a mixture thereof.

After they have been wound up, films obtained from the copolyamide substances claimed in the aforementioned patent application show a far lower tendency to lock where they have been polycondensed with silica powders in accordance with the invention because the adhesion coefficient of the completed sheet structures is reduced by more than 50%.

The invention is illustrated by but by no means limited to the following Examples:

Following Examples 1 to 5, the adhesion coefficients of films obtained by the process according to the invention from the granulate of copolyamides polycondensed in accordance with the Examples are compared with one another in a Table.

EXAMPLE 1

(No silica powder added, Comparison Example)

1600 g of aminoundecanoic acid, 196,3 g of terephthalic acid, 208,7 g of isophorone diamine (5 g excess), 1100 ml. of water, 46.7 ml. of 2 n acetic acid and 1 ml. of 3 n phosphoric acid, are heated to 200°C in an autoclave in which an oxygen-free nitrogen atmosphere prevails. An excess pressure of 12 atms. is maintained for one hour at the aforementioned temperature, after which the pressure is lowered to normal by letting off the gas phase. The melt is then heated for another 6 hours to 290°C. The molten polycondensation product is then extruded from a nozzle to form a filament which is subsequently granulated. The product has a relative viscosity of 1,85.

EXAMPLE 2

(A silica powder added in accordance with the invention)

The reaction mixture has the same composition as in Example 1 except that a dispersion of 10 g of a silica powder in 100 ml. of water is also added to it. The polycondensation process is the same as in Example 1. The finished polycondensate has a relative viscosity of 1,85.

EXAMPLE 3

(Comparison Example to Example 4, no silica powder added)

1600 g of aminoundecanoic acid, 187 g of adipic acid, 218 g of isophorone diamine (5 g excess), 1100 ml. of water, 46,7 ml. of 2 n acetic acid and 1 ml. of 3n phosphoric acid are heated to 200°C in an autoclave in which an oxygen-free nitrogen atmosphere prevails. The rest of the condensation process is the same as in Example 1. The end product has a relative viscosity of 1,82.

EXAMPLE 4

(Silica powder added in accordance with the invention)

The reaction mixture has the same composition as in Example 3 except that a dispersion of 8 g of a silica powder in 100 ml. of water is also added to it. The polycondensation process is otherwise the same as in Example 1. The end product has a relative viscosity of 1,67.

EXAMPLE 5

(Silica powder added in accordance with the invention)

1600 g of aminoundecanoic acid, 94 g of adipic acid, 106 g of terephthalic acid, 208,7 g of isophorone diamine (5 g excess), 1000 ml. of water, 46,7 ml. of 2 n acetic acid, 1 ml. of 3 n phosphoric acid and 10 g of a silica powder (Syloid No. 75) in 100 ml. of water are heated to 200°C in an autoclave in which an oxygen-free nitrogen atmosphere prevails. The condensation process is otherwise the same as in Example 1. The end product has a relative viscosity of 1,62.

EXAMPLE 6

(Silica powder added in accordance with the invention)

The reaction mixture has the same composition as in Example 5 except that instead of 10 g of the silica powder of Example 5 10 g of another silica powder (Aerosil) are added in the form of an aqueous dispersion in 100 ml. of water. The polycondensation process is the same as in Example 1. The end product has a relative viscosity of 1,68.

EXAMPLE 7

(Silica powder added in accordance with the invention)

1600 g of aminoundecanoic acid, 47,0 g of adipic acid, 159 g of terephthalic acid, 208,7 g of isophorone diamine (5 g excess), 1000 ml. of water, 46,7 ml. of 2 n acetic acid, 1 ml. of 3 n phosphoric acid and 10 g of a silica powder (Syloid No. 75) in 100 ml. of water are heated to 200°C in an autoclave in which an oxygen-free nitrogen atmosphere prevails. The rest of the polycondensation process is the same as in Example 1. The end product has a relative viscosity of 1,75.

The polycondensation products obtained in accordance with Examples 1 to 7 were granulated and extruded into tubular films.

The adhesion coefficient of these tubular films was then measured as follows:

The critical angle $\alpha$ at which a slide block covered with the different tubular films obtained from the products of the seven preceding Examples sliding down an inclined surface covered with the same film just overcomes the frictional resistance existing between both films, is measured on an inclined surface at 25°C/50 relative air humidity. The adhesion coefficient can be calculated from the angle $\alpha$:

$$tg\ \alpha\ \leqslant\ \mu\ H$$

The adhesion coefficients of the tubular films obtained from the polycondensates prepared in accordance with Example 1 to 7, determined in the manner described above, are set out in the following Table, each individual adhesion coefficient value representing an average from 20 separate measurements:

TABLE

| Example | Coefficient of adhesion inside of the tubular film ($\mu$ H) | outside of the tubular film ($\mu$ H) |
|---|---|---|
| 1 | 1.10 | 1.01 |
| 1 (after 1 year's storage) | 1.04 | 0.65 |
| 2 | 0.43 | 0.43 |
| 3 | 1.07 | 0.93 |
| 4 | 0.49 | 0.47 |
| 5 | 0.38 | 0.45 |
| 6 | 0.45 | 0.45 |
| 7 | 0.49 | 0.47 |

It can be seen from the Table that the adhesion coefficient of tubular films obtained from polycondensates in which from 0,01 to 5% by weight and preferably from 0,1 to 0,8% by weight of Syloid or Aerosil have been added to the monomers, is reduced by more than 50%.

What we claim is:

1. In the process of preparing a polyamide polymer containing silica in which said polyamide is the condensation product of a mixture of monomers consisting essentially of diamine and a dicarboxylic acid; the improvement comprising the steps of
   a. adding a water dispersion of silica powder having an average particle diameter of 5 millimicrons to 100 microns to said diamine and forming a salt of the diamine and silica whereby hazing is reduced;
   b. polycondensing said diamine and dicarboxylic acid to a polyamide containing silica condensed therein; in which the amount of silica powder is 0.01% to 10% by weight of said mixture of monomers.

2. The process of claim 1 in which said monomer mixture consists essentially of 65–85% by weight of ω-amino undecanoic acid and 35–15% by weight of a salt of a dicarboxylic acid selected from the group consisting of terephthalic acid, isophthalic acid, and an acid of the general formula $$HOOC-(CH_2)_n-COOH$$

wherein $n$ is a number greater than four, with a diamine of the general formula $$H_2N - R - NH_2$$

wherein R is
a. a mixture of the two isomers

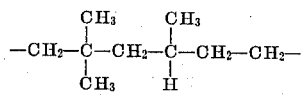

and

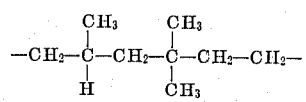

(b) 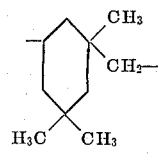

(c) $-(CH_2)_m-$ (d) 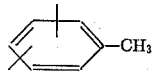

(e) 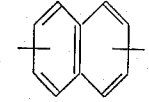

(f) 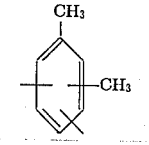

or a mixture of these radicals, wherein $m$ is a number greater than two and wherein at least 50 mol % of said diamine consists of the mixture of the two isomers

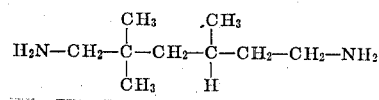

and

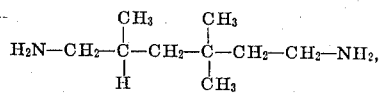

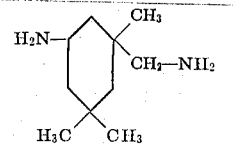

or a mixture thereof.

* * * * *